May 11, 1926.
E. F. SCHOELL
1,584,147
TRANSMISSION BAND
Filed June 5, 1925
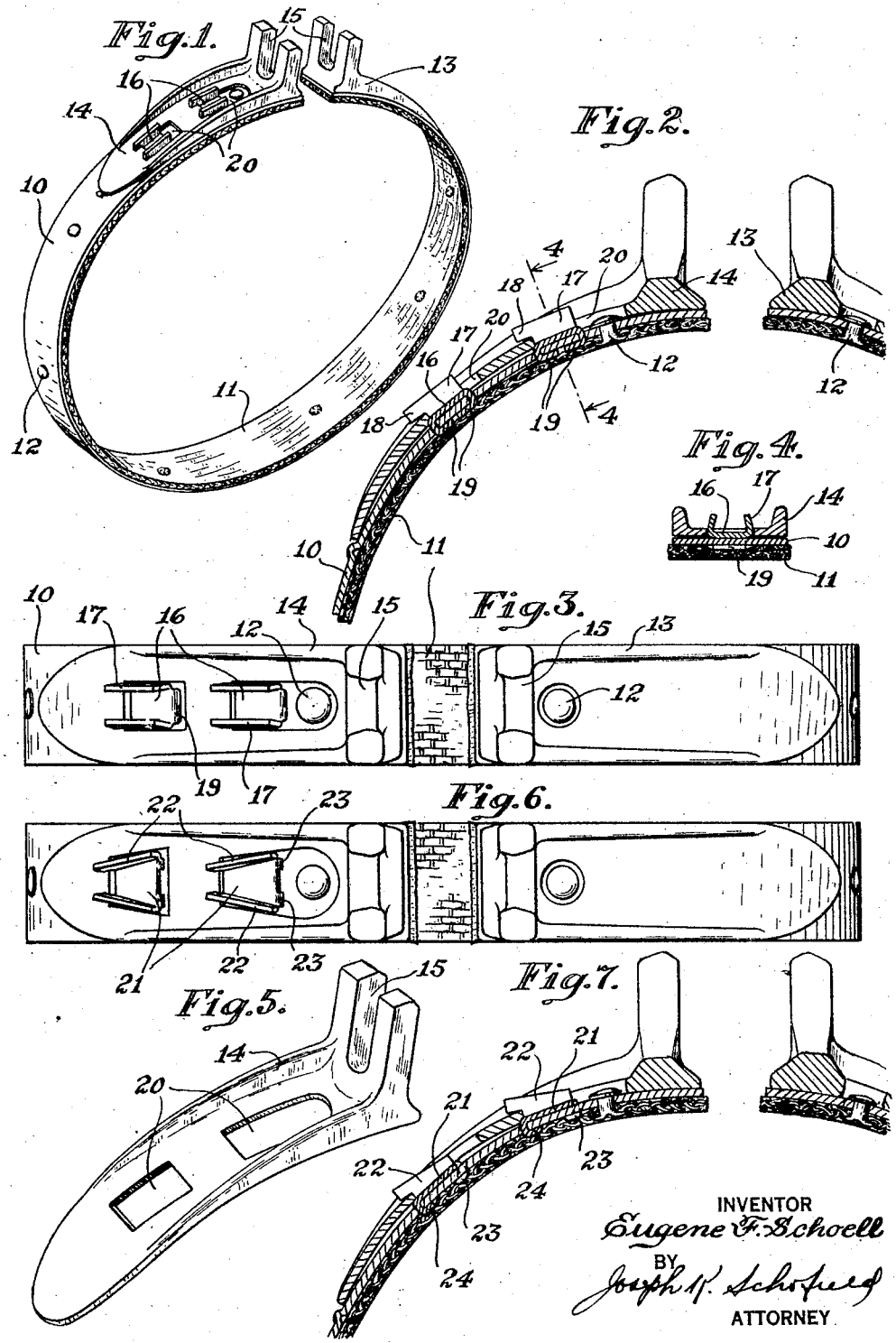
INVENTOR
Eugene F. Schoell
BY
ATTORNEY Patented May 11, 1926.

1,584,147

UNITED STATES PATENT OFFICE.

EUGENE F. SCHOELL, OF NEW BRITAIN, CONNECTICUT.

TRANSMISSION BAND.

Application filed June 5, 1925. Serial No. 35,032.

This invention relates to transmission bands adapted particularly for Ford cars.

An object of the present invention is to provide an improved form of quickly attachable transmission band having a detachable lug at one end.

Another object of the invention is to provide an improved form of fastening member for retaining the detachable lug in position on the band and which will permit the band to be removed or replaced in operative position upon the transmission drum quickly and easily.

Another object of the invention is to provide a fastener of one piece of metal having portions bent to form parts engaging the lug and also other parts or extensions adapted to pass through the band and be crimped down to retain the fastener in position upon the band.

With the above and other objects in view, my invention consists in the features of construction and operation set forth in the following specification and illustrated in the accompanying drawing.

In the accompanying drawing annexed hereto and forming a part of this specification, I have shown my invention embodied in a transmission band adapted primarily for Ford cars, but it will be understood that the invention can be otherwise embodied and that the drawing is not to be construed as defining or limiting the scope of the invention, the claims appended to this specification being relied upon for that purpose.

In the drawing:

Figure 1 is a perspective view of a complete transmission band having the present invention applied thereto.

Fig. 2 is a sectional view longitudinally through the opposite ends of a transmission band.

Fig. 3 is a front view of preferred form of the invention.

Fig. 4 is a transverse sectional view taken on the line 4—4 of Fig. 2.

Fig. 5 is a perspective view of a lug adapted to be detachably attached to a transmission band forming the present invention.

Fig. 6 is a front view of a modified form of the invention having a different fastener for the detachable lug; and Fig. 7 is a longitudinal sectional view of the band shown in Fig. 6.

In the above drawing, I have shown two forms of the invention which are now deemed preferable, but it is to be understood that changes and other modifications may be made within the scope of the appended claims without departing from the spirit of the invention.

Briefly, and in its broadest aspect, my invention comprises the following principal parts; first, a transmission band of resilient metal having a lining attached thereto; second, a lug permanently attached at one end; third, a pair of metal fasteners in aligned position on the opposite end having hooked projections for engagement with a detachable lug, and also provided with projections passing through and crimped upon the under side of the band.

Referring more in particular to the figures of the drawing, the transmission band comprises a resilient metal band 10 bent to encircle a transmission drum and provided with a suitable lining 11 on its inner surface. This lining, as usual and as shown, is rivetted directly to the band 10 by a plurality of rivets 12. At one end of the metal band 10 is a lug 13 permanently attached thereto in any preferred or usual manner. At the opposite end of the band 10 is a lug 14 similar generally to the lug 13 but detachably fastened to the band. Lugs 13 and 14 are provided with recesses 15 by means of which a tightening device (not shown) may be applied so that the band 10 may grip or be released from its drum during operation.

Transmission bands of the above general type require frequent removal and replacement to renew linings which rapidly wear out. As the space around the drum and within the housing for the drum is very cramped and restricted one of the lugs 14 is made removable so that a band 10 requiring removal and replacement may be removed and replaced without disassembling the housing by slipping the end of the band 10 after the lug 14 has been removed, around the drum. With the band 10 in place about the drum the lug 14 is replaced upon its fastening members 16. Preferably two spaced fastening members 16 are provided for the removable lug 14 positioned one in rear of the other. It is desirable therefore to provide fastening members or means 16 for the detachable lug 14 which will enable the lug 14 to be quickly fastened to the band 10 and locked against removal while the band 10 is in its operative position. The fastening members 16 also should fit closely enough to the outer surface of the band 10 so that they will not interfere with removing or replacing the bands. For this purpose I provide the fastening members 16 of an integral piece of metal fastened to the band 10 and providing hooked projections 17 adapted to be engaged by the lug 14. As shown in Figs. 1 to 4, which illustrate the preferred form of the fastening member, the hooked projections 17 are struck up from the side portions of the fastening member 16. The rear portions 18 of which overhang the rear end of the fastening member 16 and are adapted to be engaged by portions of the lug 14.

Depending from the forward and rearward ends of the fastening member 16 are extensions 19 passing through orifices in the band 10 and crimped down upon the inner surface of the band. By means of these extensions 19 the fasteners 16 are securely held in place upon the band. Preferably two of these fasteners are provided for the lug 14 aligned relatively to each other. The lug 14, as clearly shown in Fig. 5, is provided with openings 20, one directly in rear of the other, through which the fasteners 16 may extend. With the lug 14 placed over these fasteners 16 so that the fasteners 16 pass through the openings 20, the lug is forced forwardly so that the rearward overhanging projections 18 of the side portions 17 may engage over the outer surface of the lug 14 adjacent and in rear of the openings 20. When the lug 14 is in this advanced position, it is securely retained in position by the surfaces of the lug 14 being tightly wedged by the lower edges of the projections 18. To release the lug from the band 10, it is only necessary, after disengaging the tightening members, to force the lug 14 rearwardly with a light hammer blow. The lug may then be readily removed.

In Figs. 6 and 7 a modified form of fastening means is shown. The fasteners 21, instead of having their side portions 22 bent upward so that they extend parallelly, are angularly disposed relatively to each other. Also, instead of having a single downwardly extending projection upon its forward end, as in the form shown in Figs. 1 to 4, two projections 23 are formed at the opposite side portions of this forward end which extend through separate orifices formed in the band 10. By means of these forward depending extensions 23 and a rearward depending extension 24, the fastener 21 is securely held in position.

I claim:

1. A transmission band comprising in combination, a circular band, a lug detachably attached at one end, a fastener therefor having bent up lateral portions adapted to engage and retain said lug in position upon the band, and means to secure said fastener to said band.

2. A transmission band comprising in combination, a circular resilient band, a lug permanently attached at one end, a lug detachably attached at the opposite end, and a bent metal fastener for said detachable lug having hooked portions on opposite sides adapted to engage and retain the lug, and having projections at opposite ends extending through the band to retain said fastener in position upon the band.

3. A transmission band comprising in combination, a circular resilient band, a lug permanently attached at one end, a lug detachably attached at the opposite end, and a metal fastener for said detachable lug having its side portions bent upward and formed with rearward extending extensions adapted to engage and retain the lug, and having downward extending projections at its forward and rearward ends adapted to engage under said band to retain said fastener in position upon the band.

4. A transmission band comprising in combination, a circular resilient band, a lug permanently attached at one end, a lug detachably attached at the opposite end, and a metal fastener for said detachable lug having its side portions bent upward to parallel positions and formed with parallel rearward extending extensions adapted to engage and retain the lug, and having downward extending projections at its forward and rearward ends adapted to engage under said band to retain said fastener in position upon the band.

5. A transmission band comprising in combination, a circular resilient band, a lug permanently attached at one end, a lug detachably attached at the opposite end, two aligned metal fasteners for said detachable lug having rearward extending hooked portions adapted to engage over transverse edges formed within said lug and having projections extending through the band to retain said fasteners in position upon the band.

6. A transmission band comprising in combination, a circular resilient band, a lug detachably attached at one end, two aligned metal fasteners for said lug having rearward extending hooked portions formed upon the bent up side portions thereof adapted to engage over transverse edges formed within said lug, and means to secure said fastener to said band.

In testimony whereof, I hereto affix my signature.

EUGENE F. SCHOELL.